Jan. 25, 1927.   C. C. FARMER   1,615,366
VARIABLE LOAD BRAKE
Filed Feb. 20, 1925   2 Sheets-Sheet 1
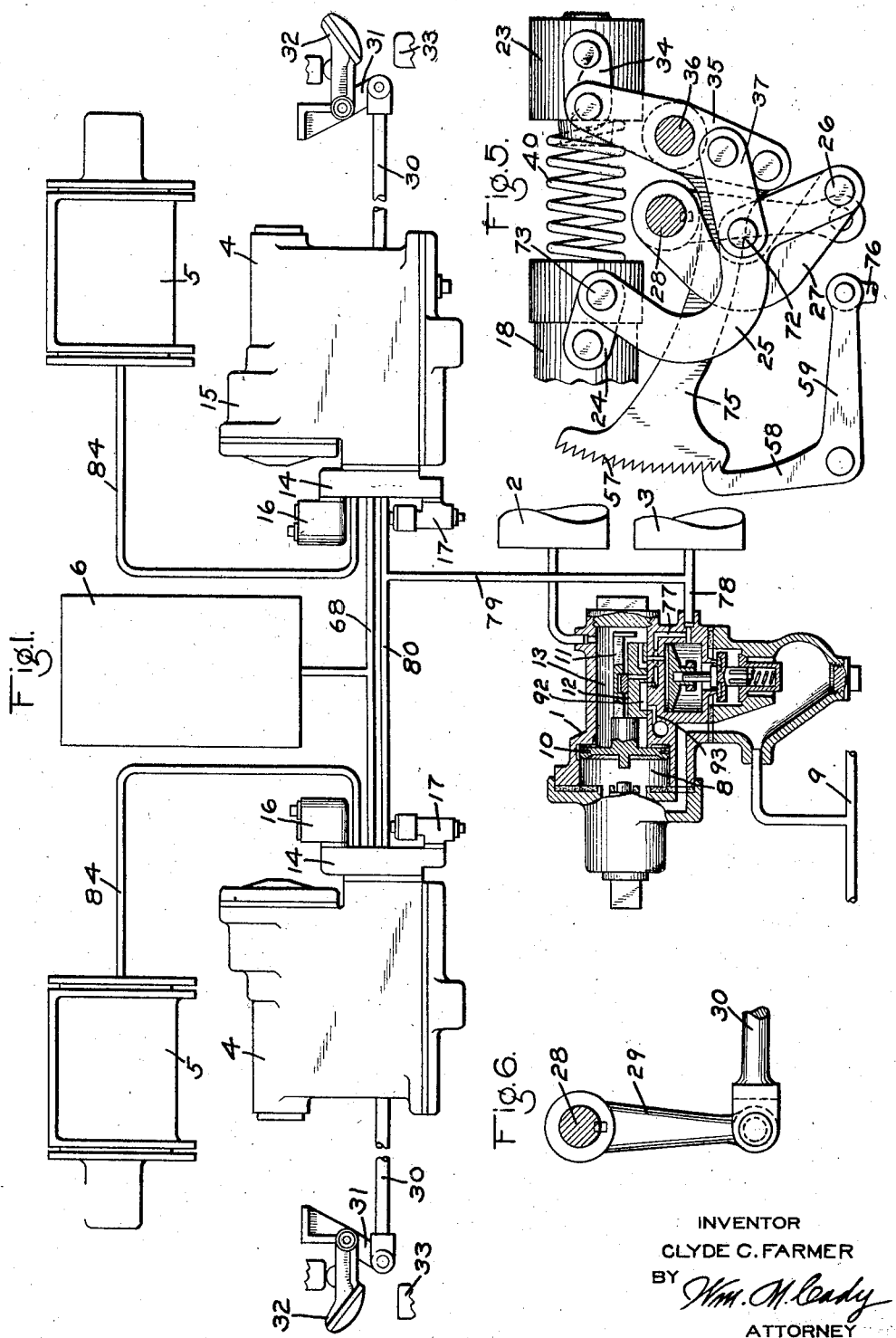
INVENTOR
CLYDE C. FARMER
BY Wm. M. Cady
ATTORNEY Jan. 25, 1927. 1,615,366
C. C. FARMER
VARIABLE LOAD BRAKE
Filed Feb. 20, 1925. 2 Sheets-Sheet 2
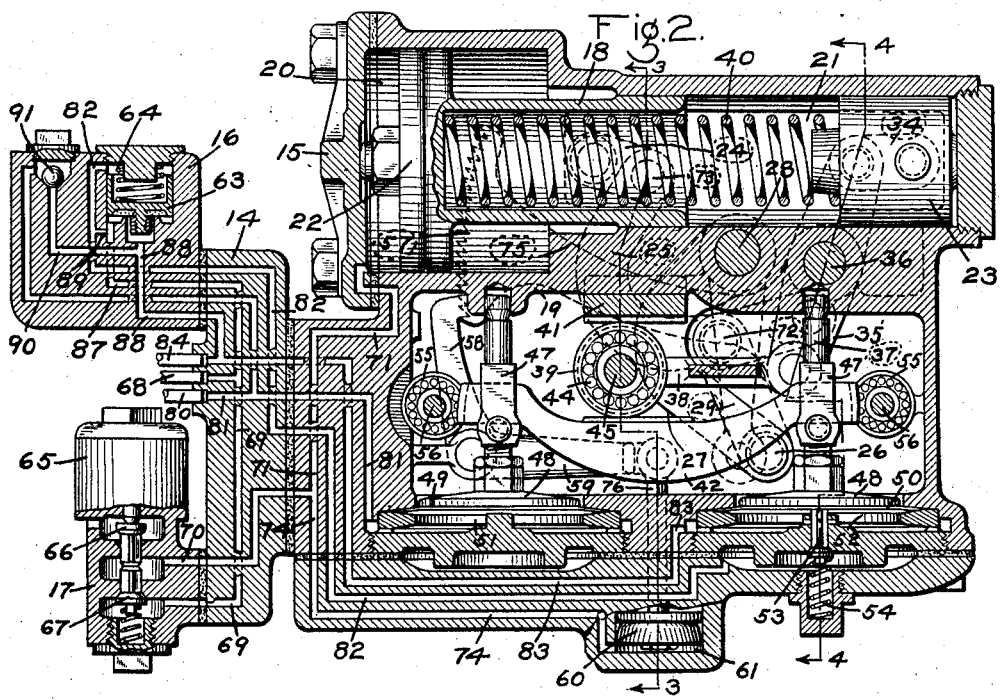
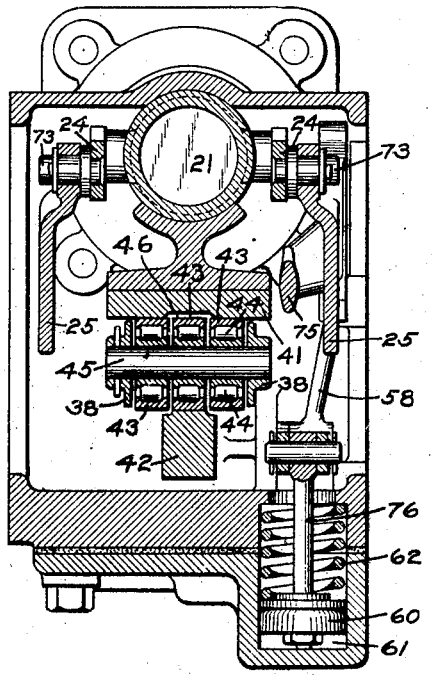
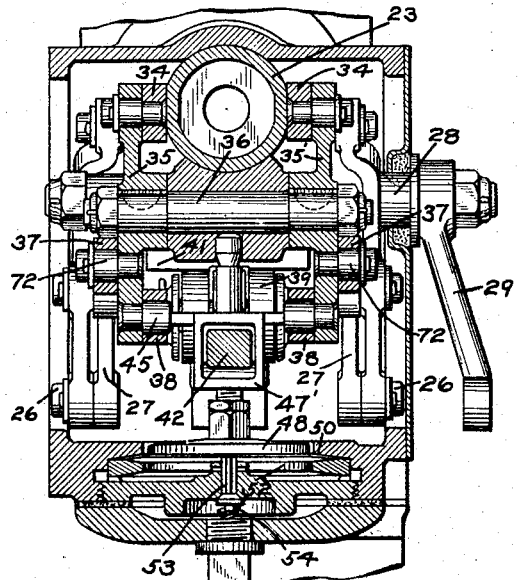
INVENTOR
CLYDE C. FARMER
BY Wm. M. Cady
ATTORNEY Patented Jan. 25, 1927.

1,615,366

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

VARIABLE-LOAD BRAKE.

Application filed February 20, 1925. Serial No. 10,456.

This invention relates to fluid pressure brakes and more particularly to a variable load brake.

As heretofore applied, variable load brake apparatus has been controlled or adjusted in accordance with the load at one or the other of the car trucks. In some cases, the load at one end of the car may be considerably different from the load at the other end, particularly on long cars and on certain proposed articulated cars, in which the adjacent ends of two cars are supported by the same truck.

According to one object of my invention, I propose to provide a variable load mechanism adapted to be associated with each car truck, so that each load mechanism will be responsive to the load on the car at the corresponding car truck, whether the truck supports an end of a single car or the adjacent ends of two cars.

Another object of my invention is to provide a variable load brake equipment in which two or more variable load mechanisms may be employed in connection with a single brake application valve device.

Another object of my invention is to provide an improved variable load brake mechanism.

Other objects and advantages will appear in the following more detailed description of the invention.

In the accompanying drawings; Fig. 1 is a diagrammatic view, partly in section, of a load brake equipment embodying my invention; Fig. 2 a central section, partly diagrammatic, of my improved variable load valve mechanism; Fig. 3 a section on the line 3—3 of Fig. 2; Fig. 4 a section on the line 4—4 of Fig. 2; Fig. 5 a detail view of the system of levers employed in connection with the variable load valve mechanism; and Fig. 6 a detail view showing the connecting means employed to connect the load valve mechanism with the adjusting means.

As shown in Fig. 1 of the drawings, the equipment may comprise a brake application valve such as the triple valve device 1, an auxiliary reservoir 2, a dummy brake cylinder 3, a variable load valve mechanism 4, a brake cylinder 5 associated with each car truck and a main reservoir 6.

The triple valve 1 may comprise a casing having a piston chamber 8 connected to the brake pipe 9 and containing a piston 10, which is adapted to operate a main slide valve 11 and a graduating valve 12 contained in a valve chamber 13, the same being open to the auxiliary reservoir 2.

According to my invention, the triple valve device does not supply fluid directly to the brake cylinder but to a dummy brake cylinder 3, the pressure in which is adapted to control the operation of two or more load valve mechanisms.

The two variable load valve mechanisms 4 are identical and may each comprise a pipe bracket portion 14 to which is attached a regulating portion 15, a relay portion 16, and a magnet portion 17. The regulating portion 15 may comprise a main casting having a central depending portion 19 in which are formed cylinders 20 and 21 containing respectively, a piston 22 and a cylindrical guide member 23, a coil spring 40 being interposed between the piston and guide member.

Attached to the stem 18 of piston 22, by means of links 24 and straddling said piston stem, are levers 25, which are connected at their opposite ends by pivot pins 26 to levers 27. The levers 27 are secured to a shaft 28, which has a bearing in the depending portion 19 and extends out of the main casting, an arm 29 being secured to its outer end. The arm 29, as shown in Fig. 6, is pivotally connected to a pull rod 30, which in turn is connected to one arm 31 of a bell crank mounted on the car body and having the other arm 32 adapted to engage a member 33 carried by the car truck.

Connected to the guide member 24 through links 34 and disposed at opposite sides of said member are levers 35 and 35′, which are secured to the opposite ends of a shaft 36, having a bearing in the depending portion 19 of the main casting. The levers 35 and 35′ are connected by links 37 to levers 25 and by links 38 to a movable fulcrum device 39. Slots are provided at the opposite sides of the depending portion 19, in order to permit movement of the links 24 and 34 by the piston 22 and guide member 23.

The movable fulcrum device 39 is interposed between a guide member 41 secured to the depending portion 19 and a fulcrum lever 42, and may comprise three rollers 43, each preferably provided with a roller bearing 44. The rollers 43 are mounted on a shaft 45 and are so arranged that the center roller will engage a finished surface of the fulcrum lever 42, while the outside rollers engage the guide member 41, which has a recess 46 to provide clearance for the center roller.

While it will be understood that other constructions may be used, the object of the preferred construction as described is to provide a free rolling action of the fulcrum device, so that friction is reduced to a minimum.

Disposed in the main casting at a distance below the respective ends of the fulcrum lever 42 are flexible diaphragms 49 and 50. One end of the lever 42 acts on the diaphragm 49 through the medium of a pin 47 having a plate 48 secured to the lower end thereof, said plate being in engagement with the diaphragm 49. The upper end of the pin extends into a bore provided in the depending portion 19 and said pin is provided with a yoke portion for receiving the end of the fulcrum lever 42.

The other end of the lever 42 acts through a similar yoke pin 47' and plate 48 engaging diaphragm 50, the movement of the diaphragm 50 being adapted to operate a pilot valve 53, which in turn controls the operation of a relay valve piston 63 and thereby the supply of fluid under pressure to the brake cylinder.

In order to prevent longitudinal movement of the fulcrum lever 42 and at the same time reduce friction due to the lateral movement of the lever, I provide rollers 55 having roller bearings and mounted on shafts 56, so as to engage the respective ends of the lever 42.

For locking the levers 35 and 35' and consequently the movable fulcrum device 39 in adjusted position, the lever 35' is provided with an arm 75, which has a ratchet segment 57, adapted to be engaged by a pawl 58 forming one arm of a bell crank, which is pivotally mounted on a bracket formed in the main casting. The other arm 59, of the bell crank, is pivotally connected to the stem 76 of an actuating piston 60 contained in a piston chamber 61, said piston being normally subject on one side to atmospheric pressure and on the other side to the pressure of a spring 62, as shown more clearly in Fig. 3.

The relay portion 16 may comprise a valve piston 63, which is subject on one side to the pressure of a spring 64. The outer seated area of the other side is subject to fluid under pressure, while the inner seated area is open to the brake cylinder. Fluid is also supplied through a restricted port 89 and passage 82 to the spring side of the valve piston, so that normally the valve piston is held seated by the spring 64 and the pressure of fluid acting on the greater area of the piston, which is exposed to the pressure on the spring side thereof.

The magnet portion 17 may comprise a magnet 65, which is adapted to operate double beat valves 66 and 67 to admit or exhaust fluid under pressure to and from the cylinder 20 and piston chamber 61.

In operation, the opening of the car doors functions to energize the magnet 65 in the same manner as described in the prior patent of Walter V. Turner, No. 1,265,001, dated May 7, 1918. The energization of magnet 65 causes the valve 66 to seat and the valve 67 to be unseated, thereby admitting fluid under pressure from the main reservoir through pipe 68, passage 69, past the unseated valve 67, and through passages 70, 71, 74, to the cylinder 20 and the piston chamber 61. The pressures exerted by the springs 40 and 62 are so proportioned as to permit the piston 22 to move to its innermost position, before the piston 60 moves upward to disengage the pawl member 58 from the ratchet segment 57 of the arm 75.

The arm 75 being locked by the engagement of pawl 58 with the ratchet segment 57, the levers 35 and 35' and the links 37 are held against movement and consequently the pivot pins 72 connecting the links 37 to the levers 25 act as fulcrums for said levers, so that the inward movement of the piston 22, before the arm 75 is released, causes movement of the levers 25 with the pivot pins 72 acting as fulcrum points. The lower ends of the levers 25 are thus rocked in a clockwise direction, causing a similar movement of the levers 27 and a clockwise rotation of the shaft 28. The arm 29 then exerts a pull on the rod 30, thereby causing the member 32 carried by the car body to engage the member 33 carried by the car truck.

After the above described movement of piston 22 has taken place, fluid under pressure will be built up in piston chamber 61 to a degree sufficient to overcome the force exerted by spring 62 and cause an upward movement of said piston. As the piston 60 moves up, the pawl 58 will be disengaged from the arm 75, leaving the levers 35 and 35' free to move.

If the load on the car should be increased by passengers entering the car, the downward movement of the car body relative to the car truck, causes the arm 32 of the bell crank carried by the car body to be moved upwardly, thereby exerting, through the member 31, an outward pull on the rod 30. Acting through the arm 29 this force causes a clockwise rotation of the shaft 28 and lever 27, which it will be evident acts through the pivot pins 26 on the lever 25.

The pivot pins 73 connecting the links 24 to the levers 25 now act as fulcrum points for the levers 25 and since the levers 35 and 35' are now free to move, due to the release of the ratchet 57, the rotation of shaft 28 causes a counter-clockwise movement of the levers 25, which in turn cause a movement of the links 37 toward the right. The levers 35 and 35' are therefore rotated in a counter-clockwise direction, so that the links 38 and the fulcrum device 39 are pulled toward the right.

It will be evident that, inasmuch as a load valve mechanism and adjusting means are provided for each truck, the above described action has taken place simultaneously at each end of the car.

When the passengers have all boarded the car and the fulcrum device 39 is adjusted accordingly, if the car doors are closed, the magnet 65 will be deenergized causing the valve 66 to be unseated and the valve 67 to be seated. This it will be seen cuts off the supply of fluid under pressure from the main reservoir 6 to cylinder 20 and piston chamber 61 and opens communication from said cylinder and piston chamber to the atmosphere by way of passages 74, 71, and 70, past unseated valve 66.

The greater pressure exerted by the spring 62 causes the piston 60 to move before the piston 22, thereby bringing the pawl member 58 into engagement with the ratchet segment 57 of the arm 56, thus locking the levers 35 and 35' and consequently the movable fulcrum device 39 in the adjusted position. The release of fluid from cylinder 22 then permits the spring 40 to return the piston 22 to its outermost position.

If the load is decreased instead of increased after the arm 32 has been moved to engagement with the member 33, carried by the car trucks, as hereinbefore described, the car springs will expand, thereby moving the arm 32 to a position of disengagement with respect to the member 33. This it will be evident permits a clockwise rotation of the arm 29, shaft 28 and levers 27 until said arm and member are again engaged.

The clockwise rotation of the arm 29, shaft 28 and lever 27 is accomplished by a spring 40 acting on the guide member 23, thereby causing a clockwise rotation of the levers 35 and 35' about the shaft 36, which acts through links 37 to rotate the levers 25 in a clockwise direction with the pivot pin 73 acting as a fulcrum. The levers 25 being connected to the levers 27 by pivot pins 26 the movement of levers 27 and rotation of shaft 28 and arm 29 is permitted according to the movement of the arm 32. The clockwise rotation of the levers 35 and 35' acts through links 38 to move the fulcrum device 39 toward empty car position.

When the brakes are operated to effect the next stop, the triple valve device 1 operates to supply fluid under pressure from the auxiliary reservoir 2 through port 77 and pipe 78 to the dummy brake cylinder 3. Fluid from the dummy brake cylinder 3 flows through pipes 79, 80 and passage 81 to diaphragm chamber 51 of both load valve mechanisms, causing the diaphragm 49 in each mechanism to be deflected upward. The plate 48 is then actuated by the diaphragm 49 to cause the yoke pin 47 to move upward and tilt the fulcrum lever 42 about the fulcrum device 39 and depress the yoke pin 47', thereby deflecting the diaphragm 50 and unseating the poppet valve 53 against the pressure exerted by spring 54.

When the valve 53 is unseated, communication from the spring side of the valve piston 63 to the brake cylinder is opened, by way of passage 82 past unseated valve 53, thence through passage 83 and pipe 84 to the brake cylinder 5. The brake cylinder being at atmospheric pressure, permits a sudden reduction of the pressure on the spring side of the valve piston 63, which causes the fluid under pressure acting on the outer seated area of the opposite side to raise said valve against the pressure exerted by spring 64.

The unseating of valve piston 63 opens communication from the main reservoir 6 to the brake cylinder through pipe 68, passage 87, past unseated valve 63, thence through passage 88 and pipe 84 to brake cylinder 5. The brake cylinder being connected to diaphragm chamber 52 by way of passage 83, when the pressure in the brake cylinder has built up to a degree sufficient to overcome the force acting downward, through the plate 48 and yoke pin 47', on diaphragm 50, said diaphragm will be deflected upward so as to permit the spring 54 to seat valve 53.

With the seating of valve 53 communication from the spring side of the valve piston 63 to the brake cylinder is cut off, which permits fluid under pressure to equalize on both sides of said valve piston by means of the choked passage 89, thus permitting the spring 64 to seat the valve piston 63 and thereby cut off the supply of fluid to the brake cylinder.

In releasing the brakes, when the triple valve parts are moved to release position, fluid from the brake cylinder flows through pipe 84, passages 88 and 90, past ball check 91, thence through pipes 80, 79 and 78, passage 77, cavity 92 and port 93 to atmosphere.

With the above described construction, it will be noted that the application valve device does not operate to supply fluid directly to the brake cylinder in applying the brakes, but instead the fluid is supplied to a dummy brake cylinder, the pressure developed in which is then employed to determine the degree of pressure of fluid supplied to the brake cylinder by operation of the load valve mechanisms. The load valve mechanisms operate to supply fluid to the brake cylinder from a separate source, such as the main reservoir, so that two or more load valve mechanisms and corresponding brake cylinders may be controlled by a single application valve device.

Having now described my invention, what I claim as new and desire to secure by Letters Patent, is:—

1. In a variable load brake, the combination with a brake pipe, a brake cylinder, and a source of fluid under pressure, of a movable abutment, a valve device operated upon a reduction in brake pipe pressure for supplying fluid under pressure to said abutment, a movable abutment subject to brake cylinder pressure, a valve operated by said abutment for supplying fluid from said source to the brake cylinder, a fulcrum lever connecting said abutments, and means operated by variations in the load on the car for adjusting the fulcrum of said lever.

2. In a variable load brake apparatus, the combination with a brake cylinder, a chamber, means operated according to the degree of fluid pressure supplied to said chamber for controlling the supply of fluid to the brake cylinder, and mechanism operated in accordance with variations in the load on the car for adjusting said means to vary the pressure of fluid supplied to the brake cylinder in proportion to the load on the car, of means operated in applying the brakes for supplying fluid under pressure to said chamber.

3. In a variable load brake apparatus, the combination with a brake cylinder, a chamber, means operated according to the degree of fluid pressure supplied to said chamber for controlling the supply of fluid to the brake cylinder, and mechanism operated in accordance with variations in the load on the car for adjusting said means to vary the pressure of fluid supplied to the brake cylinder in proportion to the load on the car, of a brake application valve device for controlling the supply of fluid under pressure to said chamber.

4. In a variable load brake apparatus, the combination with a brake cylinder, a chamber, means operated according to the degree of fluid pressure supplied to said chamber for controlling the supply of fluid to the brake cylinder, and mechanism operated in accordance with variations in the load on the car for adjusting said means to vary the pressure of fluid supplied to the brake cylinder in proportion to the load on the car, of an equalizing valve device for controlling the supply of fluid under pressure to said chamber.

5. In a variable load brake apparatus, the combination with a brake cylinder, a valve for controlling the supply of fluid to the brake cylinder, a fulcrum lever for operating said valve, and a movable abutment operated by fluid under pressure for operating said lever, of a brake application valve device for controlling the supply of fluid under pressure to said abutment.

6. In a variable load brake apparatus, the combination with a brake cylinder, a valve for controlling the supply of fluid to the brake cylinder, a fulcrum lever for operating said valve, a movable fulcrum device for said lever, a movable abutment operated by fluid under pressure for operating said lever, and mechanism operated according to the load on the car for adjusting the position of said fulcrum device, of a brake application valve device for supplying fluid under pressure to said movable abutment.

7. In a variable load brake apparatus, the combination with a brake cylinder, of valve means for controlling the supply of fluid to the brake cylinder, a movable abutment subject to brake cylinder pressure for operating said valve means, a fulcrum lever for operating said abutment, a movable abutment operated by fluid under pressure for operating said lever, a movable fulcrum device for said lever, and mechanism subject to the load on the car for adjusting the position of said fulcrum device.

8. In a variable load brake apparatus, the combination with a brake cylinder, of valve means for controlling the supply of fluid to the brake cylinder, a movable abutment subject to brake cylinder pressure for operating said valve means, a fulcrum lever for operating said abutment, a movable abutment operated by fluid under pressure for operating said lever, a brake application valve device for supplying fluid under pressure to said lever operating abutment, a movable fulcrum device for said lever, and mechanism subject to the load on the car for adjusting the position of said fulcrum device.

9. In a variable load brake apparatus, the combination with a load regulated mechanism having a fulcrum lever, of a movable fulcrum device interposed between said lever and a bearing face and comprising a roller engaging said face and a roller engaging said lever.

10. In a variable load brake apparatus, the combination with a load regulated mechanism having a fulcrum lever, of a movable fulcrum device interposed between said lever and a bearing face and comprising a roller engaging and free to roll on said face and a roller engaging and free to roll on said lever.

11. In a variable load brake apparatus, the combination with a load regulated mechanism having a fulcrum lever member, of a movable fulcrum device interposed between a guide member and said lever member and including two rollers engaging one of said members and an intermediate roller engaging the other member.

12. In a variable load brake apparatus, the combination with a load regulated mechanism having a fulcrum lever member, of a movable fulcrum device interposed between a guide member and said lever member and including two rollers engaging and free to roll on one of said members, and an intermediate roller engaging and free to roll on the other member.

13. In a variable load brake apparatus, the combination with a plurality of brake cylinders, and a load regulated valve mechanism operated by fluid under pressure for controlling the supply of fluid to each brake cylinder, of a brake application valve device for controlling the supply of fluid under pressure to the plurality of load regulated valve mechanisms.

14. In a variable load brake apparatus, the combination with a plurality of brake cylinders, a plurality of load regulated valve mechanisms operated by fluid under pressure, one for controlling the supply of fluid under pressure to each brake cylinder, and means for each valve mechanism and each controlled from a different point on the car for adjusting the corresponding valve mechanism according to the load on the car, of a brake application valve device for controlling the supply of fluid under pressure to the plurality of load regulated valve mechanisms.

15. In a variable load brake apparatus, the combination of a piston, a movable member, a spring for opposing movement of said member, a lever operatively connected to said piston, a lever operatively connected to said movable member, means operatively connecting said levers, a rotatable shaft operatively connected to said piston lever, means movable according to the load on the car and operatively connected to said shaft, and a movable fulcrum member operable by the movement of the lever which is connected to said movable members.

16. In a variable load brake apparatus, the combination with a brake application valve device, of a load valve mechanism including means for determining the degree of braking power according to the load on the car and according to the pressure of fluid supplied to said load valve mechanism by said application valve device.

17. In a variable load brake apparatus, the combination with a plurality of brake cylinders of a load regulated valve mechanism operated by fluid under pressure and according to the load on the car for controlling the supply of fluid to each brake cylinder, a common source of fluid under pressure from which each valve mechanism supplies fluid under pressure to the corresponding brake cylinder, and an application valve device operable in applying the brakes for supplying fluid under pressure to said valve mechanisms.

In testimony whereof I have hereunto set my hand.

CLYDE C. FARMER.